Nov. 18, 1958 C. F. CAROTHERS 2,860,429
WIRE GATE FASTENER
Filed May 8, 1957
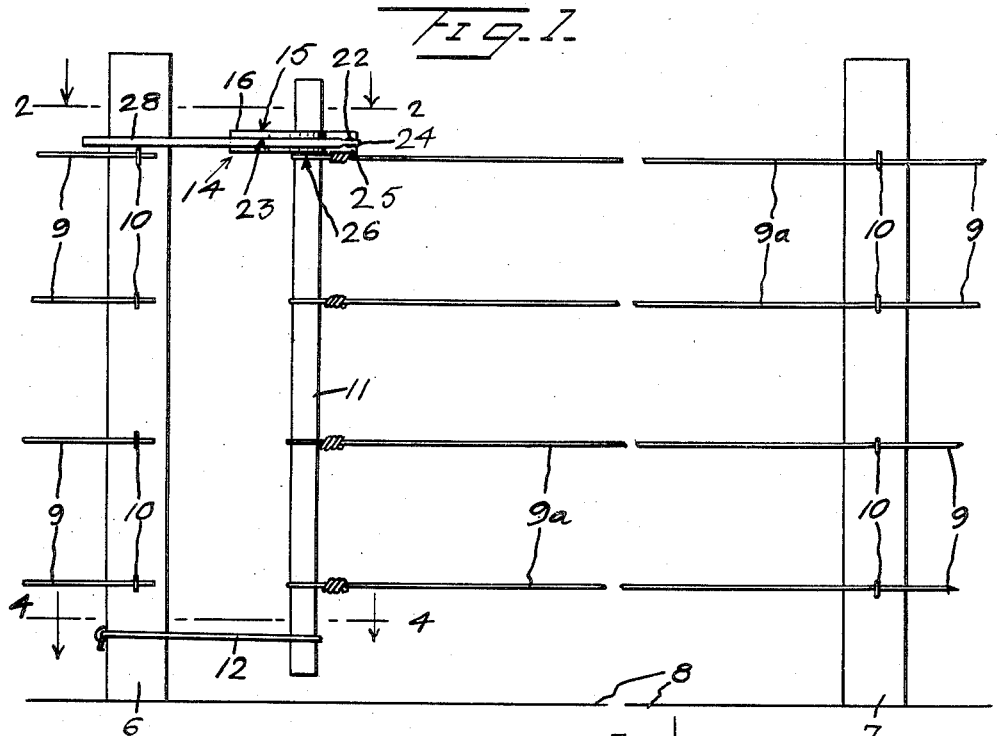
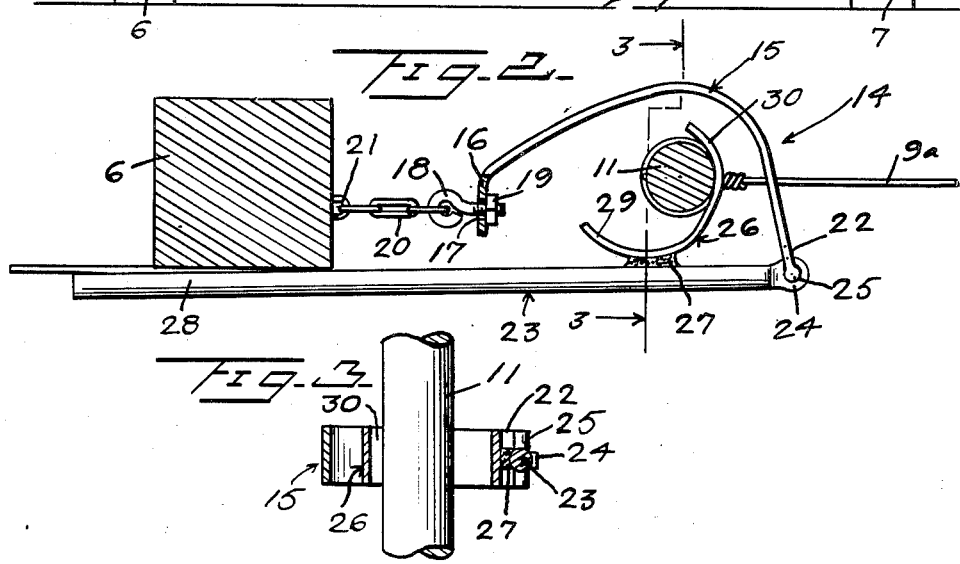
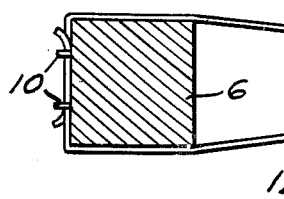
INVENTOR
C. F. Carothers
BY John N. Randolph
ATTORNEY United States Patent Office 2,860,429
Patented Nov. 18, 1958

2,860,429
WIRE GATE FASTENER
Charles F. Carothers, Chandler, Ariz.
Application May 8, 1957, Serial No. 657,783
7 Claims. (Cl. 39—74)

This invention relates to a novel fastener for wire gates of the stretch type and has for its primary object to provide a fastener of extremely simple construction which may be utilized for fastening a gate from either side thereof.

Another object of the invention is to provide a fastener including a part for engaging an end bar of a gate and which part with the gate element engaged thereby is swingable across a dead center position of a pivot of the fastener, whereby the tension of the wire gate will retain the fastener in a gate fastening position.

More particularly, it is an aim of the present invention to provide a wire gate fastener which is supported by a fence post and which cooperates with the wire gate and the fence post for maintaining the fastener in a gate fastening position.

Another object of the invention is to provide a gate fastener having a lever member capable of applying a substantial amount of force to a gate element for stretching and tensioning the wire gate when the gate is held in a closed position by the fastener, yet which will require a relatively slight amount of manual force for fastening the gate in a closed position or for releasing the gate.

Various other objects and advantages of the invention will hereinafter become more fully apparent from the following description of the drawing, illustrating a presently preferred embodiment thereof, and wherein:

Figure 1 is a fragmentary elevational view of a wire gate and a portion of a wire fence and showing the gate held in a closed position by the fastener;

Figure 2 is an enlarged horizontal sectional view, partly broken away, taken substantially along a plane as indicated by the line 2—2 of Figure 1;

Figure 3 is a transverse vertical sectional view taken substantially along a plane as indicated by the line 3—3 of Figure 2, and Figure 4 is an enlarged horizontal sectional view taken substantially along a plane as indicated by the line 4—4 of Figure 1.

Referring more specifically to the drawing, a portion of a wire fence and a wire gate of conventional construction are illustrated in Figure 1 including two adjacently disposed fence posts 6 and 7 which are anchored in the ground 8 in any conventional manner in spaced apart relation to one another. End portions of vertically spaced strands of wire 9 are anchored to the fence post 6 in any conventional manner, as by means of staples 10, and extend from the post 6 in a direction away from the post 7. The fence of which the posts 6 and 7 and the strands 9 form a part may form an enclosure of any shape or size and other portions of the strands 9 extend past the post 7 toward the post 6 and are anchored immovably to the post 7 by other suitable anchoring members, such as additional staples 10. The end portions 9a of the strands 9 which extend from the fence post 7 toward the fence post 6 have terminal ends which are disposed around and anchored to a pole or bar forming an end bar 11 of the gate. When the gate forming strand portions 9a are extended, as seen in Figure 1, the gate element 11 is capable of being positioned in close proximity to the fence post 6 but spaced somewhat therefrom, as seen in Figures 1, 2 and 4.

End portions of a strand of heavy gauge wire are anchored in overlapping relation to one another around a lower portion of the post 6 by additional staples or other anchoring fastenings 10 to form an elongated loop 12 which extends from the post 6 a short distance toward the post 7 and which is disposed somewhat above the level of the ground 8.

The wire gate fastener, designated generally 14 and comprising the invention, includes a rigid bowed bar 15 forming the fastener frame and having an inwardly turned end 16 provided with an opening 17. A threaded end of an eye screw 18 extends inwardly through and is loosely disposed in the opening 17 and has a nut 19 threaded thereon and bearing against the inner side of said frame end 16. Said eye screw 18 and nut 19 form a swivel, and one end of a flexible member, such as a short length of chain 20, is attached to the eye of the eye screw 18 and is thus swivelly connected to the frame 15. The opposite end of the flexible member or chain 20 is anchored as by means of a staple 21 to the side of the post 6 which faces the post 7 and near the upper end of said post 6.

The other end 22 of the bowed frame 15 is bifurcated to loosely receive therein one end of a lever 23. Said lever end 24 is provided with an eye which is turnably mounted on a pin 25. The ends of the pin 25 are welded or otherwise suitably secured to the terminal portions of the furcations of the bifurcated frame end 22. The lever 23 is thus connected to the frame end 22 for swinging movement relative to the frame in a plane substantially corresponding to the plane of the frame. The lever 23 is of a length substantially greater than the spacing between the frame ends 16 and 22, as seen in Figure 2.

A bowed rigid bar 26 constituting a yoke is secured to a portion of the lever 23 as by means of a weld 27. The weld 27 is connected to the outer or convex side of the yoke 26 near one end thereof and is connected to the lever 23 near to but spaced from the lever pivot 25 and so that the yoke 26 is disposed substantially coplanar with the lever 23, as seen in Figures 1 and 3. When the lever 23 is swung about the pivot 25 to position an intermediate portion of said lever spaced from but in relatively close proximity to the frame end 16, as seen in Figure 2, the yoke 26 will be disposed to extend into the frame 15 but will not contact said frame. The longer end of the yoke 26 extends from the weld or connection 27 in a direction initially toward the pivoted end of said lever but curves away from said pivot 25. Thus, the outer or convex side of the yoke 26 faces toward the lever pivot 25 and the inner concave side thereof faces away from the pivot 25.

The loop 12 is of sufficient length and extends a sufficient distance from the post 6 so that when the end bar 11 of the gate 9a, 11 is pulled toward the post 6 to tension the gate strands 9a, the lower end of the bar 11 can be engaged in the loop 12. The lever 23 will normally assume a position extending outwardly from the frame end 22 and the free end of said lever 23, constituting the handle 28 of the fastener 14, is grasped with one hand to hold the fastener extended from the post 6 toward the post 7 and in substantially a horizontal position. The upper end of the end bar 11 of the gate is then grasped and swung toward the fastener 14 and is caused to assume a position in engagement with the inner side of the yoke 26 as the lever 23 is swung about the pivot 25 toward the frame end 16 and post 6. The upper portion of the pole 11 will initially engage the inner side of the end portion 29 of said yoke when the lever 23 is disposed to extend outwardly from the frame end 22. As the lever 23 is swung clockwise about the pivot 25 toward its position of Figure 2 a portion of the gate bar 11 which is in engagement with the inner side of the yoke 26 will slide from the end 29 of said yoke toward the yoke end 30. As the yoke 26 commences to enter the open side of the frame 15 the wire strands 9a will pass across the pivot axis 25 of the lever 23 in a direction inwardly of the open side of the frame 15, after which the tension of the gate strands 9a will cause the lever 23 to swing clockwise until the handle portion thereof contacts the post 6, at which time the end bar 11 of the gate will be engaging the yoke 26 near the end 30 thereof which is disposed in the inner part of the frame 15. Thus, the tension of the strand portions 9 will lock the fastener 14 in its engaged position of Figures 1, 2 and 3 and will resist swinging movement of the lever 23 counterclockwise toward a released position.

In order to release the fastener 14 the handle 28 is grasped to swing the lever 23 counterclockwise as seen in Figure 2. This will cause the gate bar 11 to swing with and slide relative to the yoke 26 until the wire strand portions 9a pass outwardly across the pivot 25, after which the tension of said strands 9a will cause the lever 23 to swing further in a counterclockwise direction to complete release of the gate from the fastener 14. It will thus be seen that the fastener 14 will effectively function with the loop 12 to hold the gate latched closed and under tension. However, the lever 23 is of sufficient length so that a relatively small amount of manual force is required to be exerted on the handle 28 to move the lever 23 to its position of Figure 2 and counterclockwise from said position.

The swivel connection of the frame 15 to the eye screw 18 permits said frame to be rotated through a half circle so that the gate may be latched by the fastener 14 on the far side rather than from the near side, as seen in Figure 1. The nut 19 can be adjusted to lengthen or shorten the fastener 14 depending upon the tension of the gate strands 9a when the gate is latched in a closed position. It will be understood that considerable pressure will be applied by the tension strands 9a on the fastener 14 and loop 12 since the gate formed by the strand portions 9a and bar 11 will normally be from twelve to sixteen feet in length. For the sake of clarity, the spacing between the post 6 and the end bar 11 of the gate has been exaggerated considerably as compared to the spacing between the posts 6 and 7. It will also be understood that the posts 6 and 7 while constituting fence posts additionally constitute the gate posts of the gate 9a, 11.

Various modifications and changes are contemplated and may be resorted to, without departing from the function or scope of the invention as hereinafter defined by the appended claims.

I claim as my invention:

1. In combination with two spaced fence posts, a wire gate extending from one fence post including strands of wire anchored to said fence post and an end gate bar anchored to free ends of said strands and disposed adjacent said other fence post and substantially parallel thereto when the wire gate is in an extended and closed position, and a loop member anchored to said other fence post and in which a lower end of said end bar of the gate is detachably engaged; a gate fastener connected to said other fence post, above said loop, and disposed to be extended therefrom toward the first mentioned fence post, said gate fastener including a bowed bar forming a rigid frame, means tethering one end of said frame to said other fence post, a lever, means pivotally connecting one end of said lever to the other end of said frame for swinging movement of said lever relative to the frame in a plane substantially coinciding with the plane of the frame, and a yoke member rigidly secured to the lever adjacent to but spaced from the lever pivot, said yoke member having a concave inner side facing away from the lever pivot for engaging an upper portion of said end bar of the gate, said yoke member being disposed relative to the lever to swing into said frame as the lever is swung toward the open side of the frame for causing the gate strands to pass across the lever pivot in a direction inwardly of the open side of the frame whereby the tension of the wire gate will resist swinging movement of the lever away from the frame and toward a released position of the fastener.

2. In a wire gate fastener as in claim 1, said lever being of a length substantially greater than the spacing between the lever pivot and the end of said tethering means located remote therefrom whereby the other free end of the lever will bear against said other fence post when the fastener is in a closed position.

3. In a wire gate fastener as in claim 2, said tethering means comprising a nonelastic flexible element having one end anchored to said other fence post, and a fastening connected to the opposite end of said flexible element and swivelly connected to the first mentioned frame end whereby said frame may be rotated relative to the flexible element to position the lever on either side of the gate.

4. In a wire gate fastener as in claim 3, said flexible element comprising a chain, and said swivel being adjustable for varying the spacing between the anchored end of the chain and the lever pivot for varying the tension of the gate when latched in a closed position by the fastener.

5. In a wire gate fastener as in claim 1, said yoke member being longitudinally curved in such a manner relative to the lever and lever pivot whereby the gate bar portion engaged thereby will swing with the yoke member relative to the frame and will slide relative to said yoke member and longitudinally thereof during swinging movement of the lever relative to the frame toward a latched or toward a released position of the fastener.

6. A fastener for wire gates of the stretch type comprising a rigid bowed bar forming a fastener frame, nonelastic tethering means connected to one end of the frame and anchored to a fence post, a lever having one end pivotally connected to the opposite end of said frame for swinging movement toward and away from the inner open side of the frame and in a plane substantially coinciding with the plane of the frame, and a yoke member rigidly secured to said lever intermediate of the ends of the lever and facing said bowed bar and disposed for swinging movement into the open side of the frame when the lever is swung toward said first mentioned frame end, said yoke member comprising an elongated bar which is longitudinally bowed and has an inner side facing away from the lever pivot and adapted to engage an end bar of a wire stretch gate for swingably moving said end bar and the stretch gate across the lever pivot when the lever is swung toward the open side of the frame to an operative position whereby the tension of the gate will lock the fastener in an operative position when the plane of the gate is disposed inwardly with respect to the pivot and will release the fastener when the plane of the gate is disposed outwardly of the pivot.

7. A gate fastener as in claim 6, said tethering means including a swivel connected to the first mentioned frame end for swivelly mounting the frame for positioning the lever on either side of the gate.

References Cited in the file of this patent
UNITED STATES PATENTS

| | | |
|---|---|---|
| 1,334,997 | Grenard | Mar. 30, 1920 |
| 1,772,326 | Smith | Aug. 6, 1930 |
| 2,704,900 | Olson | Mar. 29, 1955 |